United States Patent
Minemura et al.

(10) Patent No.: US 9,736,513 B2
(45) Date of Patent: Aug. 15, 2017

(54) COMMUNICATION DEVICE AND COMMUNICATION METHOD

(71) Applicant: Kabushiki Kaisha Toshiba, Tokyo (JP)

(72) Inventors: Takashi Minemura, Ome (JP); Daisuke Sano, Suginami-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/452,381

(22) Filed: Aug. 5, 2014

(65) Prior Publication Data
US 2014/0351844 A1 Nov. 27, 2014

Related U.S. Application Data

(63) Continuation of application No. PCT/JP2013/059344, filed on Mar. 28, 2013.

(51) Int. Cl.
*H04N 21/254* (2011.01)
*H04N 21/436* (2011.01)
(Continued)

(52) U.S. Cl.
CPC ..... *H04N 21/2541* (2013.01); *H04N 21/4126* (2013.01); *H04N 21/42224* (2013.01);
(Continued)

(58) Field of Classification Search
None
See application file for complete search history.

(56) References Cited

U.S. PATENT DOCUMENTS

| 8,406,245 B2 | 3/2013 | Raveendran |
| 8,497,843 B2 | 7/2013 | Nose |

(Continued)

FOREIGN PATENT DOCUMENTS

| JP | 2004-72317 | 3/2004 |
| JP | 2004-32247 | 6/2004 |

(Continued)

OTHER PUBLICATIONS

International Search Report and Written Opinion from corresponding PCT/JP2013/059344 mailed Mar. 28, 2013.
(Continued)

*Primary Examiner* — Omar S Parra
(74) *Attorney, Agent, or Firm* — Rutan & Tucker, LLP

(57) ABSTRACT

According to one embodiment, communication device includes communication module, operation module, image generator, and transmission controller. The operation module receives user operation. The image generator generates a first display image displayed on a display screen of a target device. The transmission controller performs, when there are contents to be transmitted to the target device and requiring copyright protection, controlling so as to generate the first display image comprising the contents to be transmitted and to transmit the generated first display image to the target device in a certain copyright protection system. Further, the transmission controller performs, when there are contents to be transmitted to the target device and requiring no copyright protection, controlling so as to generate the first display image comprising the contents to be transmitted and an image corresponding to the user operation and to transmit the generated first display image to the target device.

18 Claims, 11 Drawing Sheets

(51) Int. Cl.
  *H04N 21/472* (2011.01)
  *H04N 21/41* (2011.01)
  *H04N 21/4363* (2011.01)
  *H04N 21/8355* (2011.01)
  *H04N 21/63* (2011.01)
  *H04N 21/422* (2011.01)

(52) U.S. Cl.
  CPC ..... *H04N 21/436* (2013.01); *H04N 21/43637* (2013.01); *H04N 21/472* (2013.01); *H04N 21/631* (2013.01); *H04N 21/8355* (2013.01)

(56) References Cited

U.S. PATENT DOCUMENTS

| | | | |
|---|---|---|---|
| 8,584,179 | B2 | 11/2013 | Isozaki et al. |
| 2010/0067393 | A1 | 3/2010 | Sakimura et al. |
| 2010/0182261 | A1 | 7/2010 | Nose |
| 2011/0010607 | A1 | 1/2011 | Raveendran |
| 2011/0134062 | A1 | 6/2011 | Chiba et al. |
| 2012/0079551 | A1 | 3/2012 | Isozaki et al. |
| 2012/0113001 | A1* | 5/2012 | Yamauchi ............... G06F 3/038 345/157 |
| 2013/0182645 | A1 | 7/2013 | Raveendran |
| 2014/0281988 | A1* | 9/2014 | Watts ...................... G06F 3/017 715/716 |

FOREIGN PATENT DOCUMENTS

| | | |
|---|---|---|
| JP | 4377438 | 9/2009 |
| JP | 2010-165269 | 7/2010 |
| JP | 2011-118731 | 6/2011 |
| JP | 2012-074771 | 4/2012 |
| JP | 2012-533220 | 12/2012 |
| WO | WO 2011-145330 | 11/2011 |
| WO | WO 2012-105552 | 8/2012 |

OTHER PUBLICATIONS

Office Action from JP Application 2013-547767 issued on May 16, 2014 (English Translation).

* cited by examiner

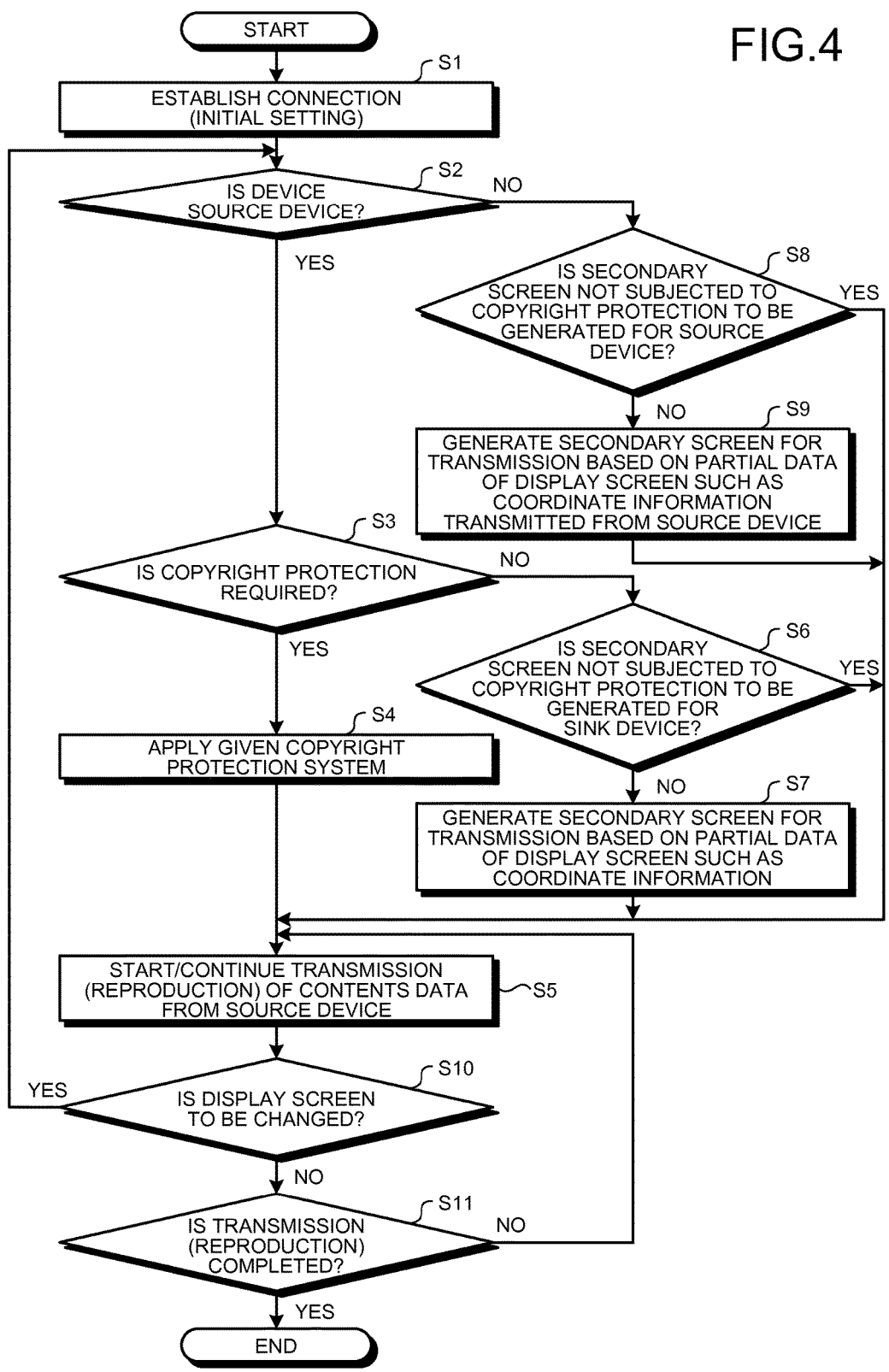

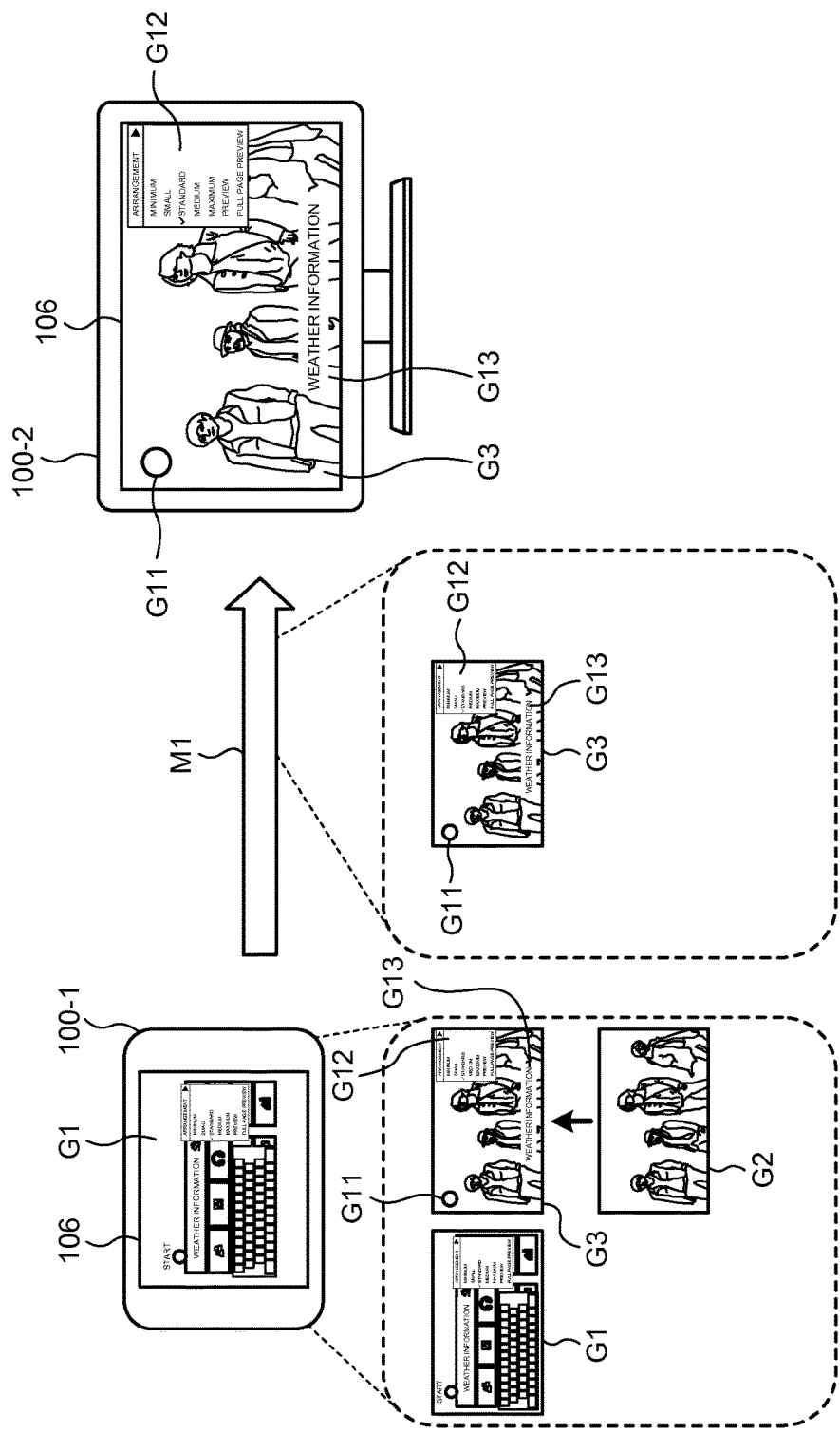

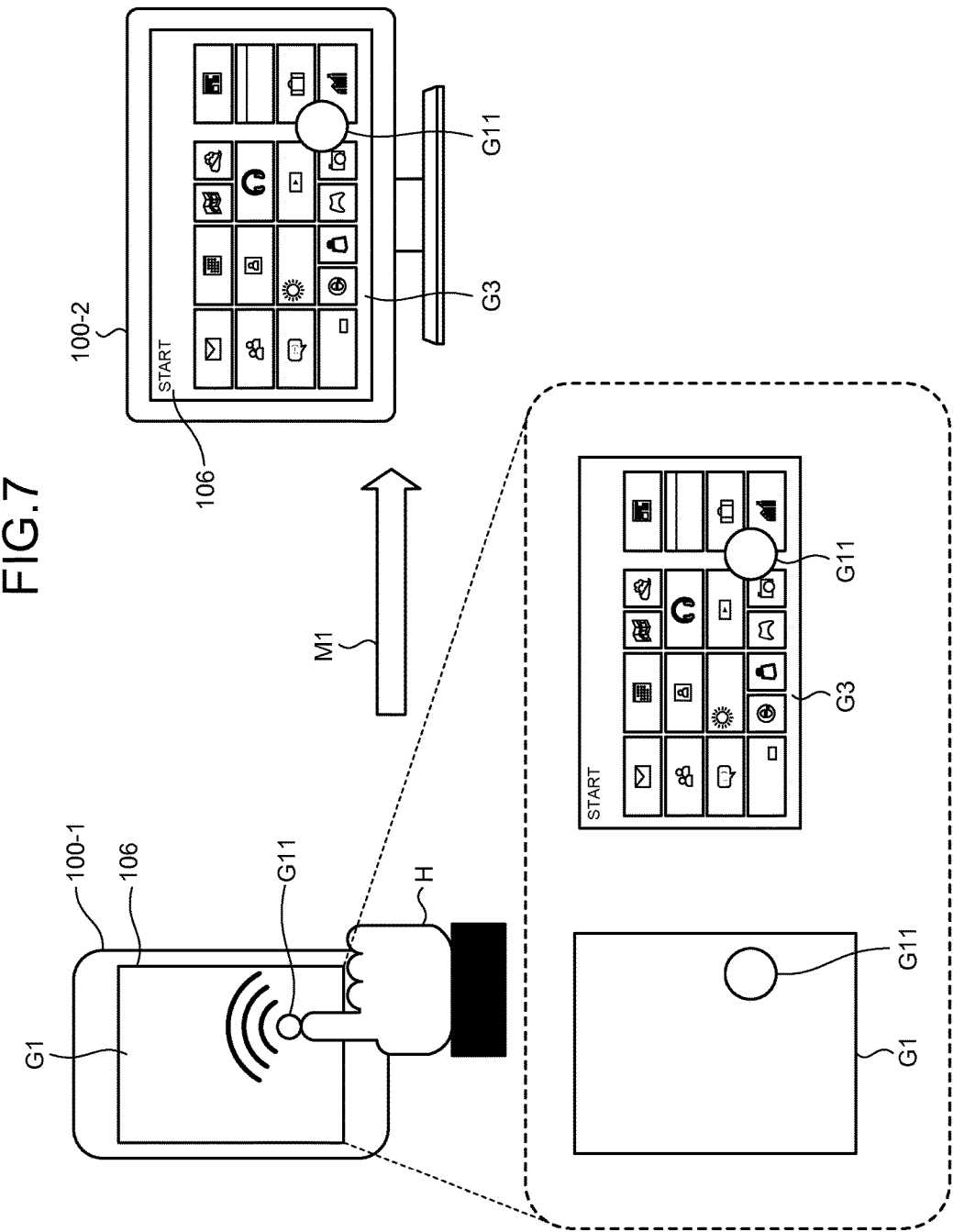

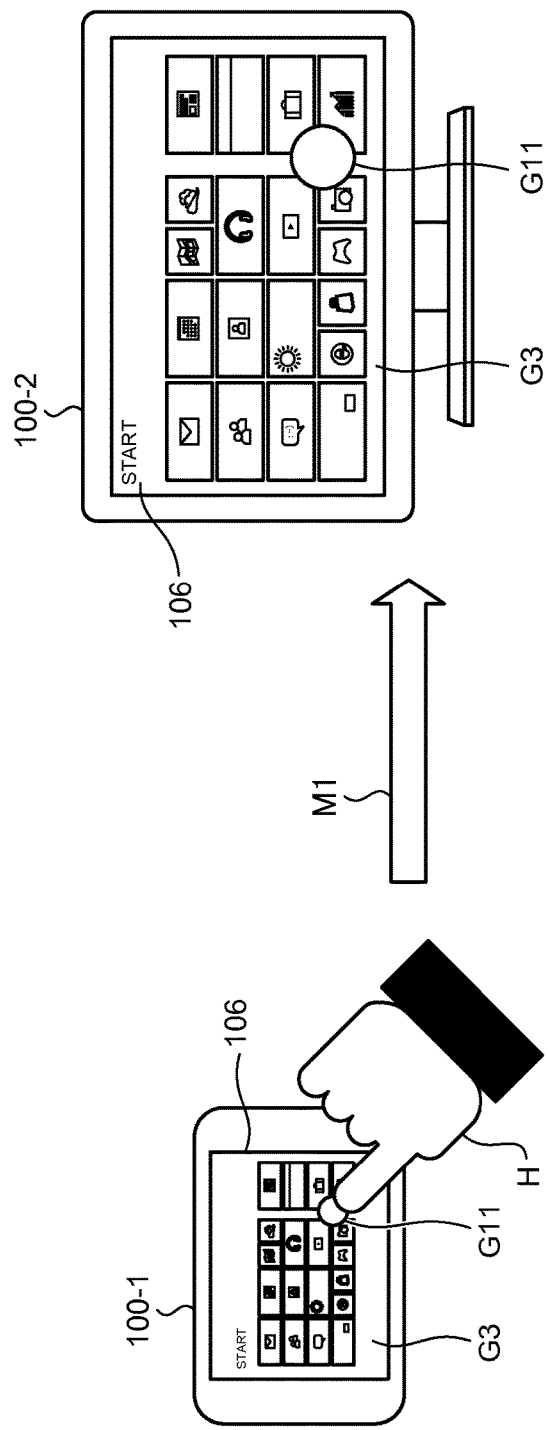

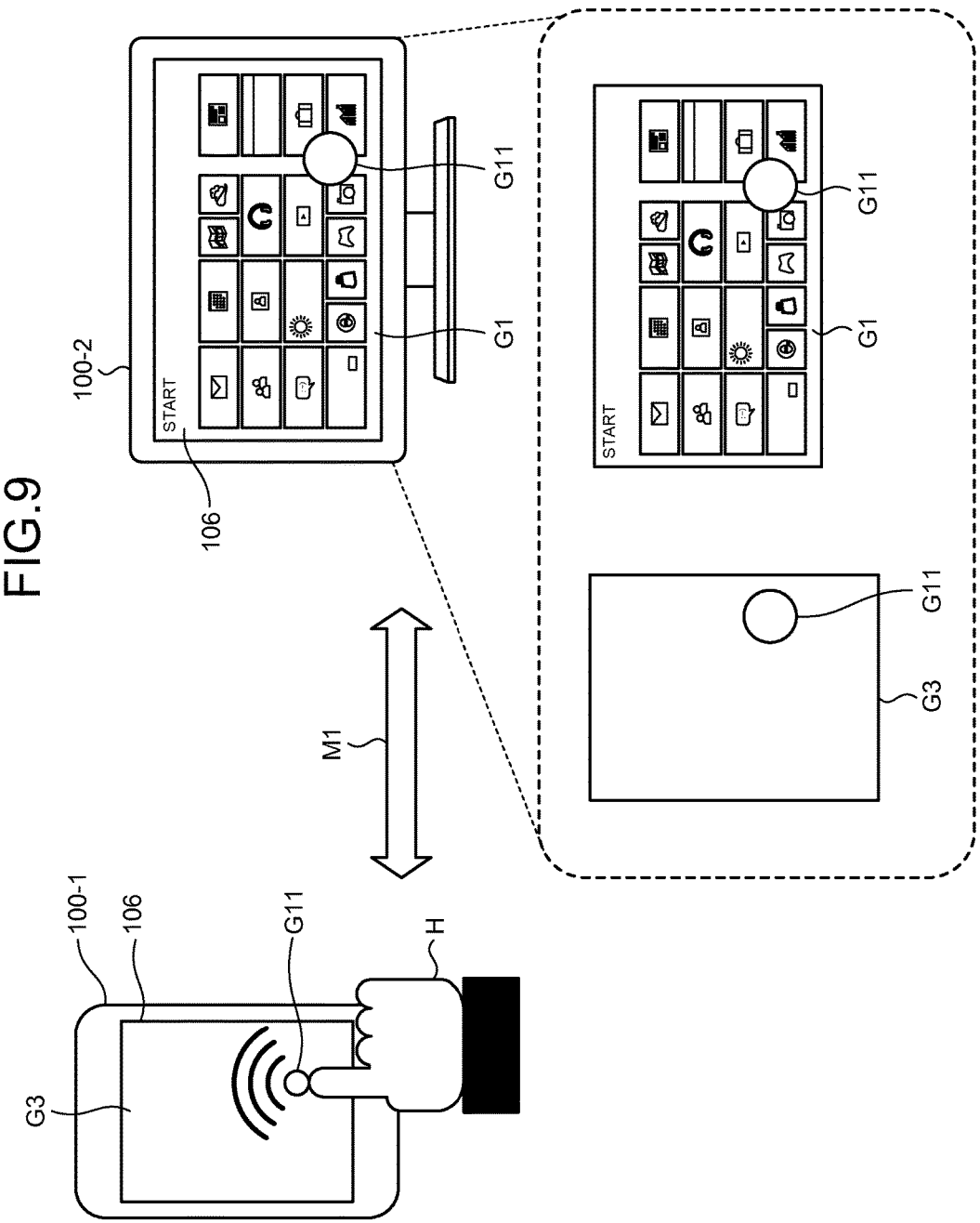

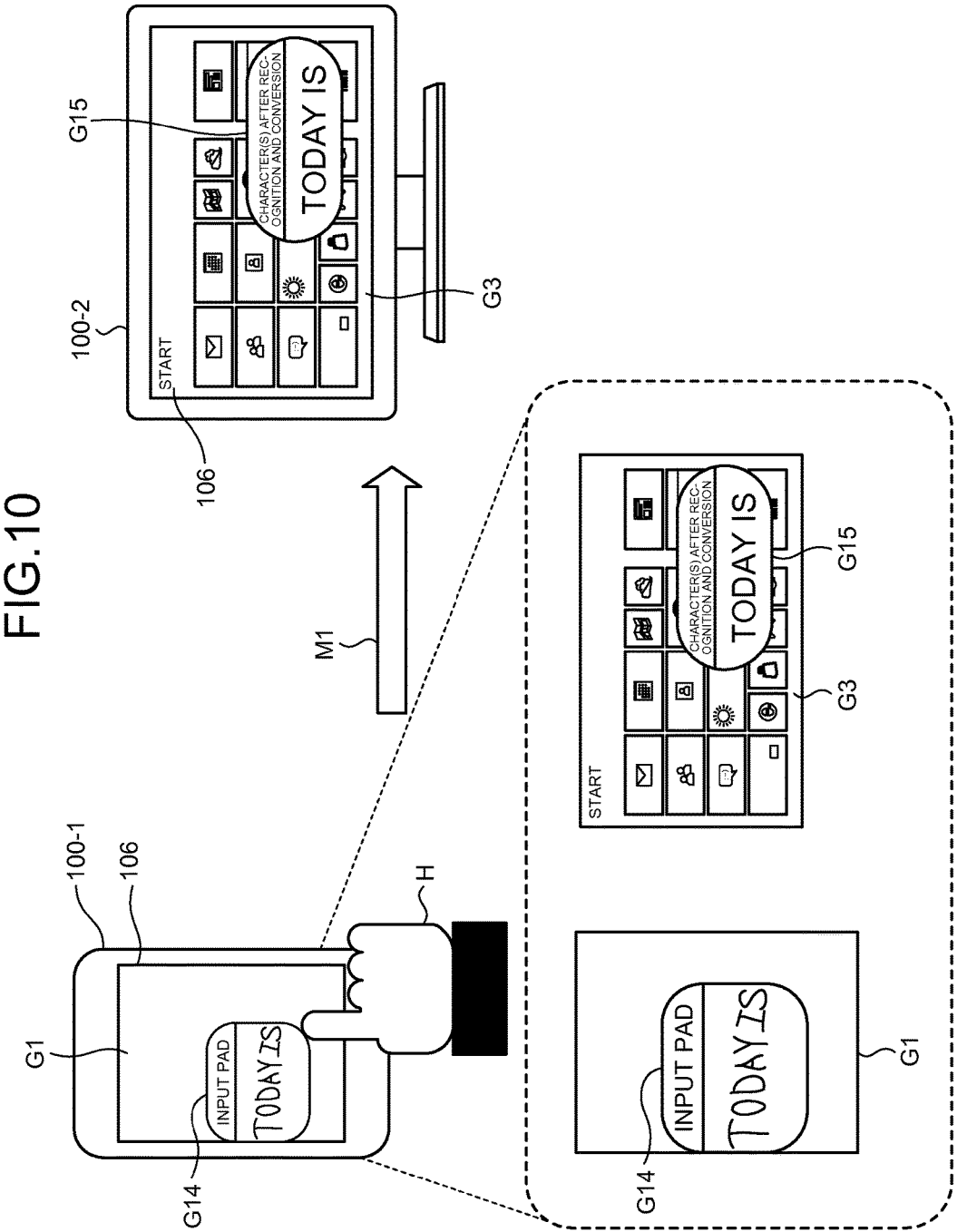

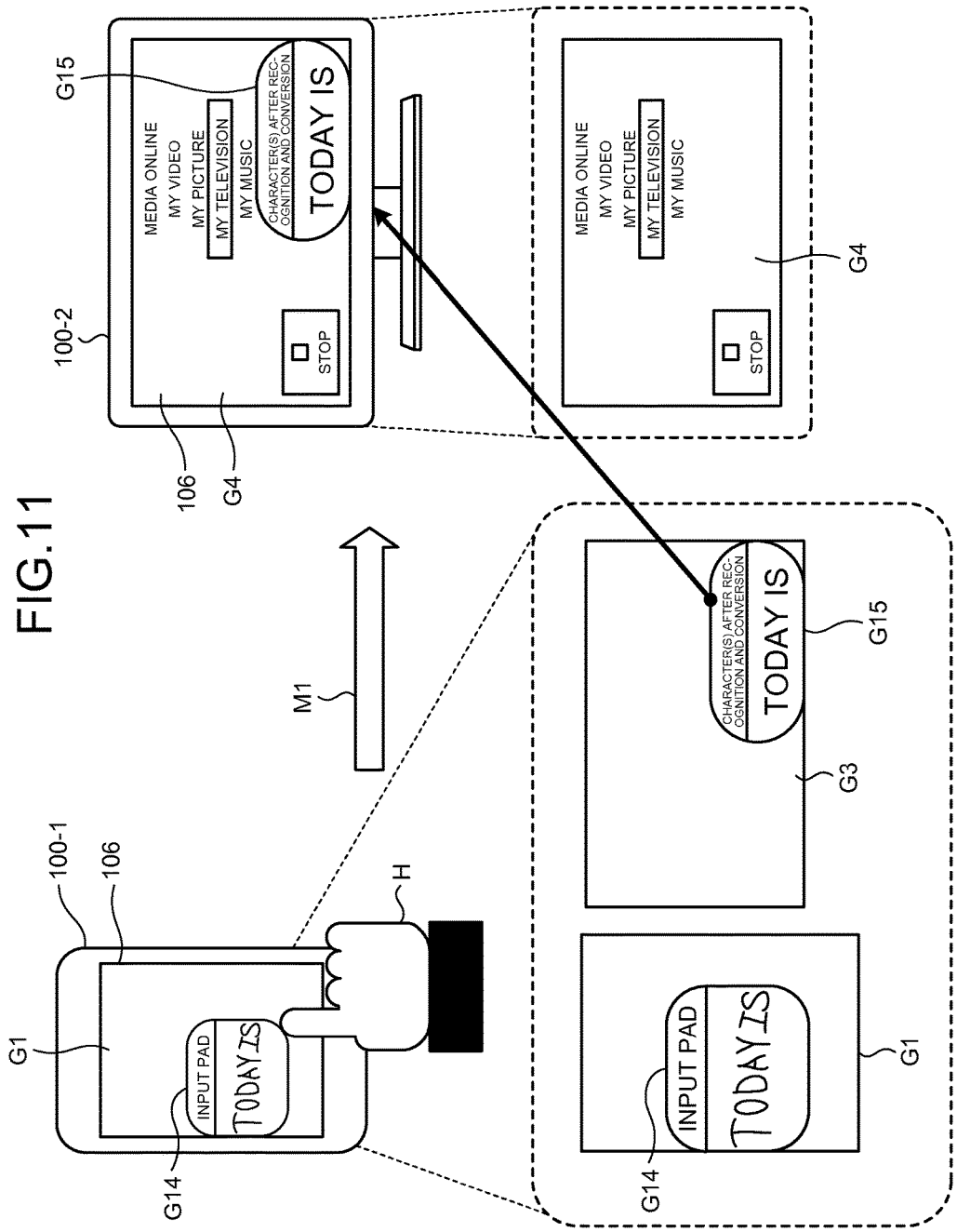

COMMUNICATION DEVICE AND COMMUNICATION METHOD

CROSS-REFERENCE TO RELATED APPLICATIONS

This application is a continuation of International Application No. PCT/JP2013/059344, filed Mar. 28, 2013, the entire contents of which are incorporated herein by reference.

FIELD

Embodiments described herein relate generally to a communication device and a communication method.

BACKGROUND

Conventionally, among electronic equipment such as a television receiver, a recorder, and a tablet terminal, there is a communication device such as a contents transmission device (hereinafter, referred to as a source device) and a contents reception device (hereinafter, referred to as a sink device) that respectively transmits and receives contents files (hereinafter, referred to as contents) containing video information, audio information, or information combining them. Such a communication device transmits contents from a source device to a sink device through a wireless path such as a wireless local area network (LAN), so that the sink device reproduces the contents. When the reproduced contents are contents subjected to copyright protection, the contents are transmitted in a copyright protection system such as High-bandwidth Digital Content Protection (HDCP) and Digital Transmission Content Protection over Internet Protocol (DTCP-IP).

While the sink device reproduces contents after the source device transmits them to the sink device, the source device may receive operation from a user to confirm information. For example, when the source device is a tablet type information terminal, the user may confirm various kinds of information by operating a touch panel of the information terminal in his/her hand while viewing contents reproduced in the sink device. In the conventional technology described above, the sink device allows only reproduction of the contents. Thus, the user needs to confirm display of the source device also to confirm various kinds of information corresponding to the operation, which is inconvenient.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 4 is an exemplary flowchart of one example of operation of the communication devices in the embodiment;

FIG. 6 is an exemplary conceptual diagram exemplifying display screens of the communication devices in the embodiment;

FIG. 7 is an exemplary conceptual diagram exemplifying display screens of the communication devices in the embodiment;

FIG. 8 is an exemplary conceptual diagram exemplifying display screens of the communication devices in the embodiment;

FIG. 9 is an exemplary conceptual diagram exemplifying display screens of the communication devices in the embodiment;

FIG. 10 is an exemplary conceptual diagram exemplifying display screens of the communication devices according to a modification; and FIG. 11 is an exemplary conceptual diagram exemplifying display screens of the communication devices in the modification.

DETAILED DESCRIPTION

In general, according to one embodiment, a communication device comprises a communication module, an operation module, an image generator, and a transmission controller. The communication module is configured to communicate with a target device connected through a transmission path. The operation module is configured to receive a user operation. The image generator is configured to generate a first display image displayed on a display screen of the target device. The transmission controller is configured to perform, when there are contents to be transmitted to the target device and requiring copyright protection, controlling so as to generate the first display image comprising the contents to be transmitted and to transmit the generated first display image to the target device in a certain copyright protection system. Further, the transmission controller is configured to perform, when there are contents to be transmitted to the target device and requiring no copyright protection, controlling so as to generate the first display image comprising the contents to be transmitted and an image corresponding to the user operation and to transmit the generated first display image to the target device.

The following describes a communication device, a communication method, and a computer program according to an embodiment in detail with reference to the accompanying drawings.

Figure 1:
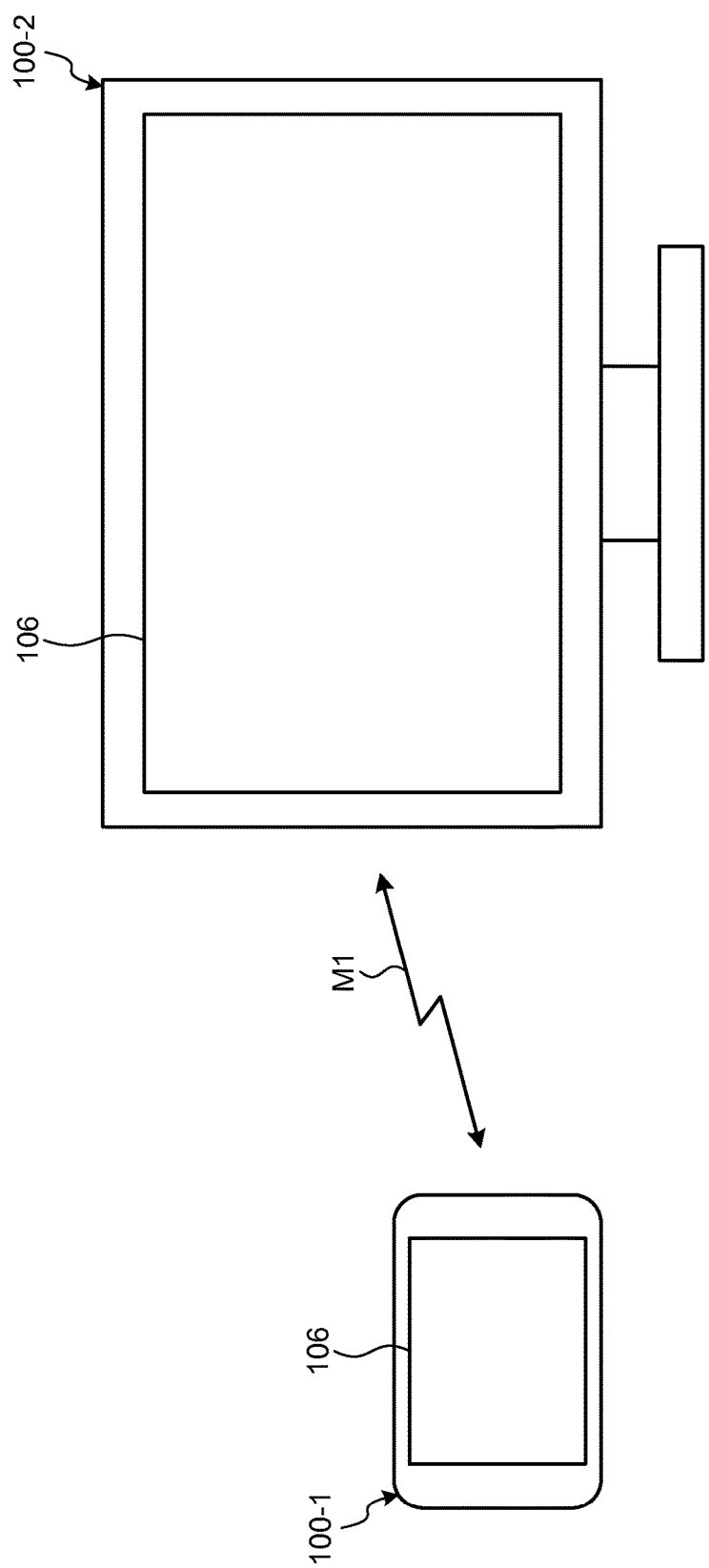
FIG. 1 is an exemplary explanatory diagram of a schematic configuration of one example of a system comprising communication devices according to an embodiment.

FIG. 1 is an explanatory diagram of a schematic configuration of one example of a system comprising communication devices 100-1 and 100-2 according to the embodiment. As illustrated in FIG. 1, the communication device 100-2 is a television receiver provided with a display 106 such as a liquid crystal display. The communication device 100-1 is a tablet terminal provided with the display 106 such as a liquid crystal display having a touch panel laminated thereon.

The communication devices 100-1 and 100-2 are connected to each other through a wired or wireless transmission path M1 so that they can perform mutual communication. To be more specific, the communication devices 100-1 and 100-2 are connected to each other through a high-definition multimedia interface (HDMI), a WirelessHD, a wireless LAN in 2.5 GHz band, 5 GHz band, and 60 GHz band (IEEE 802.11 series, etc.), etc. The embodiment exemplifies a configuration in which the communication devices 100-1 and 100-2 are wirelessly connected to each other and the communication device 100-1 is portable. However, a wired path may exist on a path from the communication device 100-1 to the communication device 100-2. For example, when a repeater (not illustrated) such as an access point of a wireless LAN is interposed, it is possible that the communication device 100-1 and the repeater are connected wiredly and the repeater and the communication device 100-2 are connected wirelessly.

The communication device 100-1 transmits video signals (image data) and the accompanying audio signals (audio data) of contents of programs, etc., that are received in digital terrestrial broadcasting, etc., to the communication device 100-2 through the transmission path M1. The communication device 100-2 can receive the video signals and the audio signals transmitted from the communication device 100-1, and output (reproduce) video and audio related to the video signals and the audio signals. Note that the transmission of contents from the communication device 100-1 to the communication device 100-2 and the reproduction of contents in the communication device 100-2 may be performed in an opposite direction. To be more specific, the transmission of contents from the communication device 100-2 to the communication device 100-1 and the reproduction of contents in the communication device 100-1 may be performed.

The communication devices 100-1 and 100-2 support the wireless image rendering technique such as Wi-Fi Display, and both support a protection system for copyright protection of contents having copyright, such as high-bandwidth digital content protection (HDCP) and a serial copy management system (SCMS). In various image transmission systems, the communication device 100-1 corresponds to a source device (video transmission device), while the communication device 100-2 corresponds to a sink device (video reception device). The communication devices 100-1 and 100-2 support the technique referred to as digital living network alliance (DLNA) that achieves mutual operation of digital home network equipment, and both may support the DTCP-IP, etc. The communication device 100-1 can transmit contents of programs, etc., received in digital terrestrial broadcasting, etc., to the communication device 100-2 while protecting the copyright by applying the above-mentioned protection system.

In the embodiment, a normal television receiver exemplifies the communication device 100-2, and a normal tablet terminal exemplifies the communication device 100-1. However, it is needless to say that the communication devices 100-1 and 100-2 may be devices such as a hard disk recorder and a set-top box as long as the devices perform transmission and reception of contents of programs, etc., received in digital terrestrial broadcasting, etc.

Moreover, the embodiment exemplifies a configuration in which the communication device 100-1 corresponding to a source device and the communication device 100-2 corresponding to a sink device are connected to each other one to one. However, the connection may be one to many. For example, a plurality of source devices may be connected to one sink device, so that contents transmitted from the source devices are displayed on a display screen of the sink device in a divided manner. Alternatively, one source device may be connected to a plurality of sink devices, so that contents transmitted from the source device are displayed on display screens of the sink devices.

Figure 2:
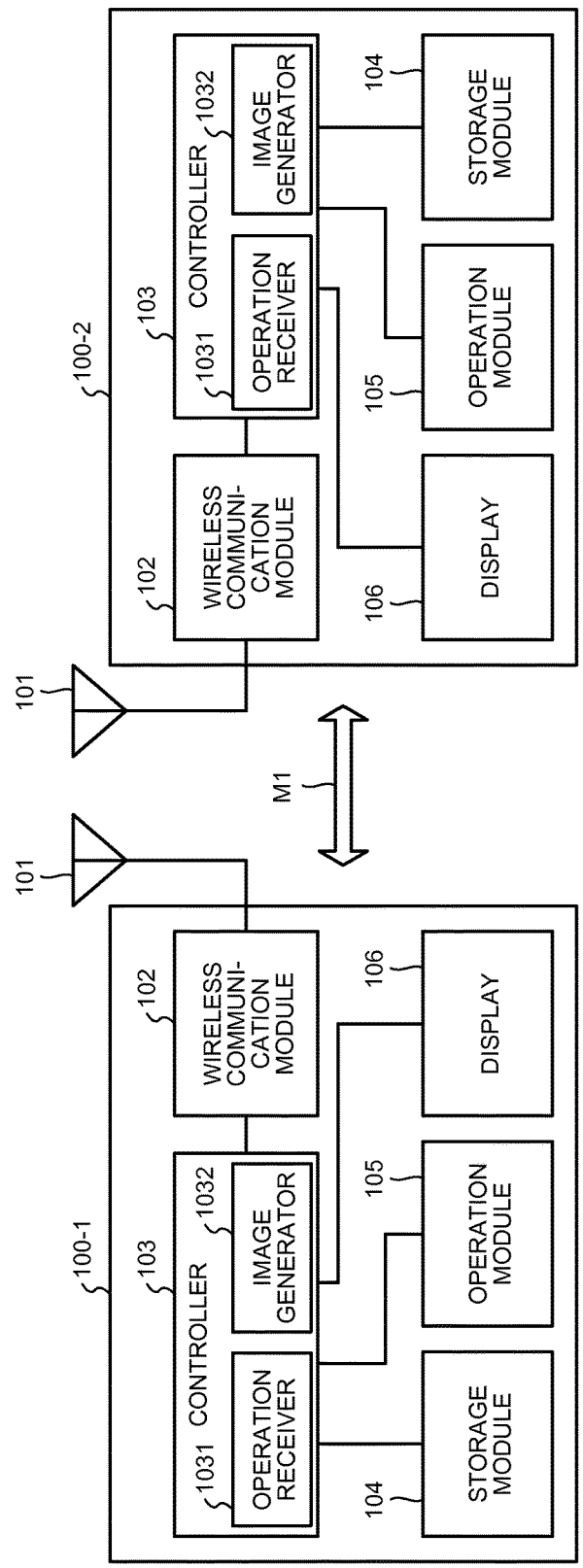
FIG. 2 is an exemplary block diagram of one example of a function configuration of the communication devices in the embodiment.

FIG. 2 is a block diagram of an example of a function configuration of the communication devices 100-1 and 100-2 in the embodiment. As illustrated in FIG. 2, the communication devices 100-1 and 100-2 comprise a wireless communication module 102 that is a wireless communication module performing wireless communication through an antenna 101 and a controller 103 that controls the operation of the wireless communication module 102.

The wireless communication module 102 performs communication with a target device (the communication device 100-2 provided that the device comprising such a wireless communication module 102 is the communication device 100-1) through the transmission path M1 standardized by IEEE 802.11, etc., under control of the controller 103. To be more specific, the wireless communication module 102 performs transmission and reception of contents between the communication device 100-1 and the communication device 100-2. The controller 103 comprises a central processing unit (CPU), a random access memory (RAM), a read only memory (ROM), etc. The CPU loads programs stored in the ROM into the RAM and sequentially executes them, whereby the operation of the communication device is controlled. Examples of the operation of the communication device controlled by the controller 103 include display control of display on a display screen of the display 106, control of transmission and reception of contents through the transmission path M1, and transmission control of contents to which a given protection system is applied, for example. The CPU sequentially executes programs, whereby the controller 103 provides functions as an operation receiver 1031 and an image generator 1032.

The communication device 100-1 and 100-2 may comprise a memory 104, an operation module 105, and the display 106. The memory 104 is, for example, a nonvolatile memory that stores various kinds of setting information for the control performed by the controller 103. The operation module 105 may be operation keys, a touch panel, etc., to receive a user operation. In the case of the touch panel, for example, the operation module 105 receives a touch operation performed by the user touching the touch panel. The operation module 105 detects a touch position touched by the user on the touch panel and a touch direction indicating a direction in which the touch position is moved with time. The controller 103 performs display control to display a pointer image in accordance with the touch position and move the pointer image corresponding to the touch direction for example, based on the touch position and the touch direction detected by the operation module 105. The display 106 may be a liquid crystal display that performs screen display under control of the controller 103.

The operation receiver 1031 receives the user operation based on detection signals from the operation keys, the touch panel, etc., of the operation module 105. In the case of the touch panel, for example, the operation module 105 detects a touch operation performed by the user touching the touch panel. To be more specific, the operation module 105 detects a touch position touched by the user on the touch panel and a touch direction indicating a direction in which the touch position is moved with time. The operation receiver 1031 receives, as the user operation, the coordinates corresponding to the touch position detected by the operation module 105 and the coordinates indicating the touch direction detected by the operation module 105. The controller 103 performs display control to display the pointer image in accordance with the coordinates of the touch position and move the pointer image corresponding to the touch direction for example, based on the coordinates corresponding to the touch position and the coordinates indicating the touch direction.

The image generator 1032 generates an image (second display image) displayed on a display screen of the display 106 of the device comprising the image generator 1032, and an image (first display image) displayed on a display screen of the display 106 of a target device. To be more specific, the image generator 1032 generates an image comprising a graphical user interface (GUI) such as a pointer image, a menu image, and various kinds of information that correspond to the user operation received by the operation receiver 1031 to be displayed on the display screen of the display 106.

Figure 3A:
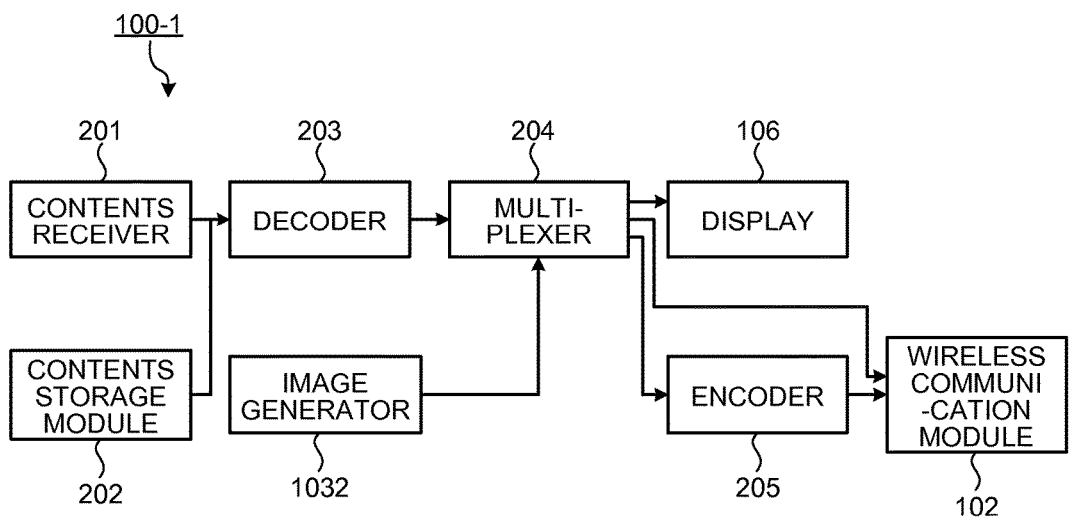
FIG. 3A is an exemplary block diagram of a configuration regarding video processing of the communication device in a transmission side in the embodiment.

FIG. 3A is a block diagram of a configuration regarding video processing of the communication device 100-1 in the transmission side in the embodiment. As illustrated in FIG. 3A, the communication device 100-1 comprises a contents receiver 201, a contents storage module 202, a decoder 203, a multiplexer 204, the display 106, an encoder 205, and the wireless communication module 102, for example. The contents receiver 201 may be a tuner that receives image signals (image data) of contents of programs in digital terrestrial broadcasting and other media, and a communication module that receives image signals (image data) of Internet Protocol television (IPTV) broadcasting distributed through a network, for example. The contents storage module 202 stores image data. The decoder 203 decodes encoded moving image data input from the contents receiver 201 or the contents storage module 202. The decoder 203 outputs decoded image data to the multiplexer 204. The image generator 1032 generates image data of the GUI, as described above, and outputs it. The multiplexer 204 multiplexes the image data output from the decoder 203 and the image data output from the image generator 1032 to generate an image data (screen data) to be displayed on the display screen of the display 106. The multiplexer 204 may superpose the GUI on the decoded image so that the GUI overlaps the decoded image or may superpose the decoded image so that the decoded image is embedded into a portion of the GUI. Then, the multiplexer 204 outputs the generated image data to the display 106 to display it on the display 106.

When transmitting the image displayed on the display 106 to the communication device 100-2, the multiplexer 204 outputs the multiplexed image data also to the encoder 205 or the wireless communication module 102. For example, when transmitting the image using the standard such as Wi-Fi Display, the multiplexer 204 outputs the image data to the encoder 205, whereas when transmitting the image using the uncompressed image transmission standard such as Wireless HD, the multiplexer 204 outputs the image data to the wireless communication module 102. Upon receipt of an input of a decoded image of the contents protected by copyright from the decoder 203 while receiving an input of a GUI image from the image generator 1032, the multiplexer 204 may output a multiplexed image of them to the display 106 while outputting an image not containing the GUI image to the encoder 205 or the wireless communication module 102.

The embodiment describes a case in which the multiplexer 204 outputs image data to the encoder 205 or the wireless communication module 102. However, when another module (high image quality module, etc.) is interposed between the multiplexer 204 and the display 106, such a module may output the image data to the encoder 205 or the wireless communication module 102. Furthermore, when an image not containing the image generated by the image generator 1032 is transmitted to the communication device 100-2, the output from the decoder 203 may be input to the encoder 205 or the wireless communication module 102.

The encoder 205 encodes the image data from the multiplexer 204, and generates encoded image data. The wireless communication module 102 packetizes the encoded image data obtained by encoding into a format appropriate for image transmission, and transmits the image data to the communication device 100-2. Alternatively, the wireless communication module 102 transmits the image data from the multiplexer 204 in the uncompressed state to the communication device 100-2. The above processing allows the communication device 100-1 to transmit the image displayed on the display 106 to the communication device 100-2 in near real time. In other words, the communication device 100-1 can acquire data of the image displayed on the display 106, and transmit the acquired image to the communication device 100-2. The communication device 100-1 may transmit an image to the communication device 100-2 without displaying the image on the display 106.

Figure 3B:
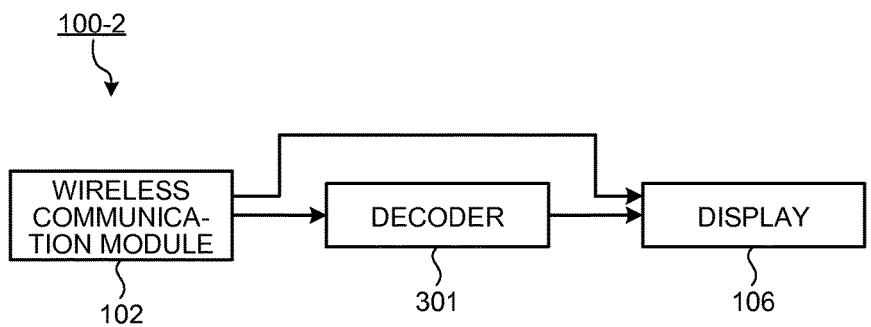
FIG. 3B is an exemplary block diagram of a configuration regarding video processing of the communication device in a reception side in the embodiment.

FIG. 3B is a block diagram of a configuration regarding video processing of the wireless communication module 102 in the reception side in the embodiment. As illustrated in FIG. 3B, the communication device 100-2 comprises the wireless communication module 102, a decoder 301, and the display 106. The wireless communication module 102 receives encoded image data or uncompressed image data that is transmitted from the communication device 100-1. The decoder 301 decodes the encoded image data. The display 106 displays an image using the image data from the wireless communication module 102 or the image data from the decoder 301.

The following describes, in detail, the operation of the communication devices 100-1 and 100-2 performed under control of the controller 103, more concretely, the operation of transmitting contents from the source device to the sink device and reproducing the contents on the sink device.

FIG. 4 is a flowchart of an example of operation of the communication devices in the embodiment. As illustrated in FIG. 4, when the processing is started by specifying contents transmitted from the source device to the sink device for example, the controller 103 establishes communication connection (initial setting) with a target device (S1) through the transmission path M1.

Then, the controller 103 determines whether the device (device comprising the controller 103) is a source device transmitting contents to be reproduced in the sink device (S2). To be more specific, the controller 103 determines that the device is a source device when the device transmits, in response to an operation on the operation module 105, contents stored in the storage module 104 in the device or contents of digital terrestrial broadcasting received by the device to the target device. In the embodiment, for example, the controller 103 of the communication device 100-1 determines that the communication device 100-1 is a source device, and the controller 103 of the communication device 100-2 determines that the communication device 100-2 is a sink device.

When the device is a source device (Yes at S2), the controller 103 of the device determines whether contents to be transmitted are contents requiring no copyright protection (S3). The controller 103 determines whether the contents require copyright protection with reference to a packetized elementary stream (PES) enclosed in header information of the contents.

When the contents require copyright protection (Yes at S3), the controller 103 applies a certain copyright protection system such as DTCP-IP, HDCP, and SCMS to the contents to be transmitted (S4) and starts/continues the transmission of the contents data from the device (communication device 100-1) as a source device to the target device (communication device 100-2) through the transmission path M1 (S5).

At S4 and S5, the controller 103 controls the image generator 1032 to generate a display image containing the contents to be transmitted as they are (in the state keeping the identity) as a display image to be displayed on the display screen of the target device, and transmits the generated display image to the target device. Moreover, the controller 103 controls the image generator 1032 to generate a display image containing a pointer image, a menu image, and various kinds of information that correspond to the operation on the operation module 105 as a display image to be displayed on the display screen of the device comprising the controller 103, and displays the generated image on the display 106.

Figure 5:
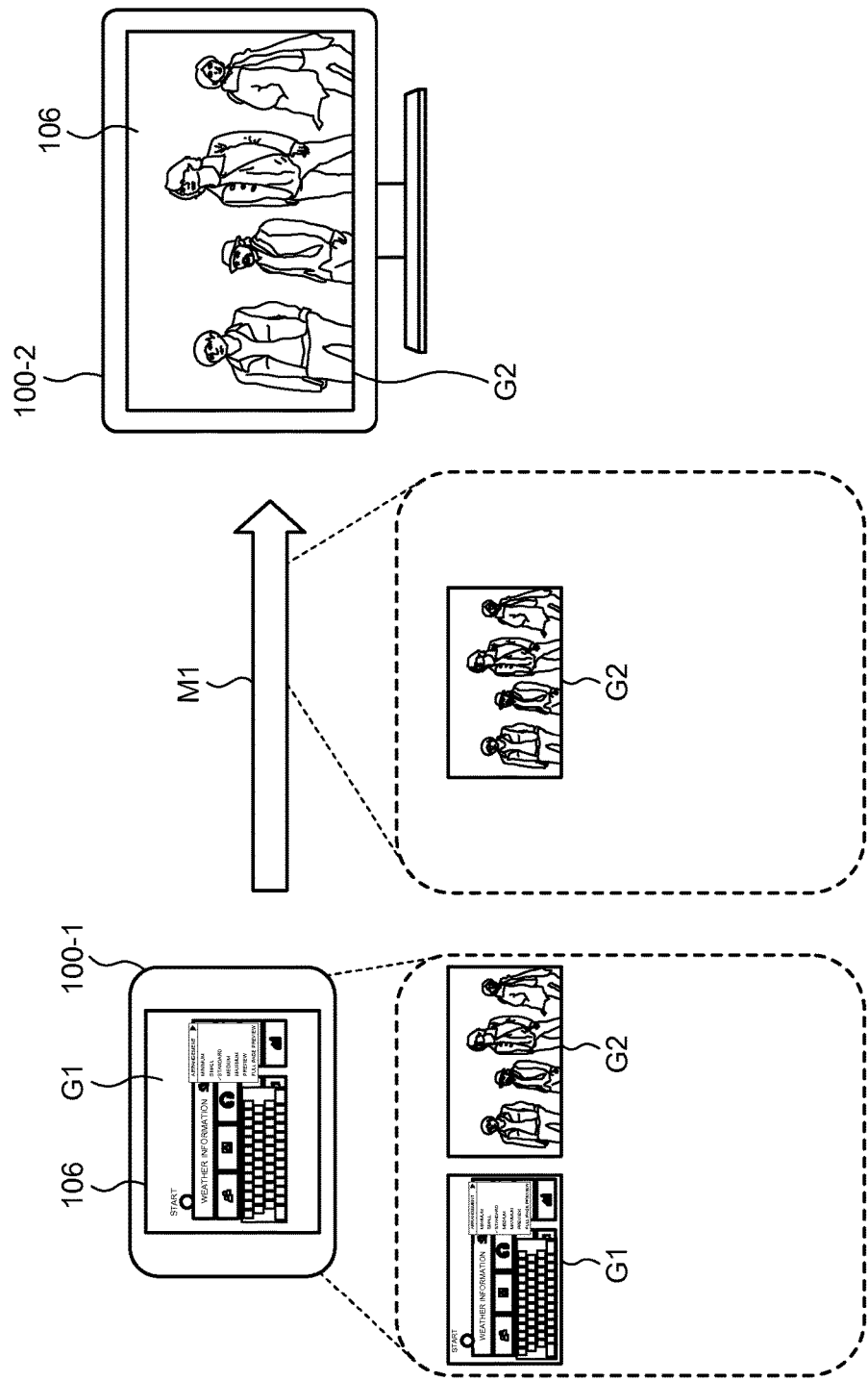
FIG. 5 is an exemplary conceptual diagram exemplifying display screens of the communication devices in the embodiment.

FIG. 5 is a conceptual diagram exemplifying display screens of the communication devices 100-1 and 100-2 in the embodiment. As illustrated in FIG. 5, the communication device 100-1 on the source device generates a display image G1 and a display image G2. The display image G1 corresponds to the operation on the operation module 105. The display image G2 contains contents to be transmitted as they are. The display 106 of the communication device 100-1 displays the display image G1. Here, the display 106 may display an image of the display image G1 superposed on the display image G2, or may display only the display image G1 as in FIG. 5. The controller 103 of the communication device 100-1 may display an image prompting the user to select a mode in which the display 106 displays only the display image G1 or a mode in which the display 106 displays an image of the display image G1 superposed on the display image G2, and switch the mode according to the operation on the image. The generated display image G2 is transmitted to the communication device 100-2 through the transmission path M1 and displayed on the display 106 of the communication device 100-2. In this manner, the communication device 100-2 reproduces contents whose identity is kept by copyright protection.

When the contents require no copyright protection (No at S3), the controller 103 determines whether a secondary screen not subjected to copyright protection is to be generated for the sink device (S6). The secondary screen is a screen for the display corresponding to the user operation performed on the source device, and contains, in addition to the contents to be reproduced, a pointer image, a menu image, and various kinds of information that correspond to the user operation, for example. Therefore, it is determined at S6 that the secondary screen is to be generated when the operation module 105 receives the user operation and that the secondary screen is not to be generated when the operation module 105 does not receive the user operation.

When the secondary screen not subjected to copyright protection is to be generated (No at S6), the controller 103 controls the image generator 1032 to generate a secondary screen for transmission to the sink device based on partial data of the display screen of the display 106 such as coordinate information corresponding to the operation on the operation module 105 (S7). To be more specific, the controller 103 controls the image generator 1032 to generate a display image containing contents to be transmitted and a pointer image, a menu image, and an image of various kinds of information that correspond to the operation on the operation module 105, and transmits the generated display image to the target device.

FIGS. 6, 7, and 8 are conceptual diagrams exemplifying a display screen of the communication devices 100-1 and 100-2 in the embodiment. FIG. 6 is a diagram exemplifying display screens when a touch operation is performed on a software keyboard. FIGS. 7 and 8 are diagrams exemplifying display screens when a pointer image G11 is operated by a touch operation with a hand H of the user.

As illustrated in FIGS. 6 and 7, the communication device 100-1 on the source device generates the display image G1 corresponding to the operation on the operation module 105, and a display image G3 containing, in the display image G2 of contents to be transmitted, the pointer image G11, a menu image G12, and an information image G13 that correspond to the operation on the operation module 105. The communication device 100-1 may generate the display image G3 without the pointer image G11, and may output position information corresponding to the operation on the operation module 105 to the communication device 100-2 so that the communication device 100-2 generates and displays the pointer image G11.

In FIG. 7, the communication device 100-1 operates as a touch pad. The display 106 displays the display image G1 (black screen, for example) for receiving a touch operation. Upon receipt of a touch operation on the operation module 105, the controller 103 executes processing based on the touch operation in accordance with the coordinate information output by the operation module 105 in response to the touch operation and the coordinate information of the pointer positioned when the previous touch operation, which is performed before the current touch operation, is finished. Here, the communication device 100-1 does not display the display image G3 on the display 106. However, the communication device 100-1 can store coordinate information of the position of the pointer G11 operated by the touch operation (tracing operation) in the display image G3. The G3 contains the GUI such as icons operable in accordance with a touch on the screen. When another touch operation is detected again after one touch operation is finished, the position of the pointer G11 in the display screen G3 is controlled based on the stored coordinate information and the coordinate information from the operation module 105. When the operation module 105 receives tapping for example, the controller 103 selects an icon at the position of the pointer G11 and executes processing of activating the corresponding application, for example.

Then, the generated displayed image G3 is transmitted to the communication device 100-2 through the transmission path M1 and displayed on the display 106 of the communication device 100-2. That is, when user operation is performed on the communication device 100-1 while the communication device 100-2 reproduces contents not subjected to copyright protection, the display 106 of the communication device 100-2 displays the pointer image G11, the menu image G12, and the information image G13 that correspond to such operation. Therefore, even when operating the communication device 100-1 while viewing contents reproduced in the communication device 100-2, the user does not need to confirm the display 106 of the communication device 100-1, which improves the convenience.

In the example of FIG. 8, the communication device 100-1 on the source device generates the display image G3 containing the GUI such as icons operable in accordance with a touch on the screen and displays the G3. The communication device 100-1 may or may not display the pointer image G11 at a position where a touch operation performed by the user is received. When receiving a touch operation on the operation module 105 (touch panel provided on the display 106), the communication device 100-1 executes processing in accordance with the GUI displayed at a position where the touch operation is performed. That is, when receiving the touch operation performed on a position where an icon is displayed for example, the controller 103 of the communication device 100-1 selects the icon and executes processing of activating the corresponding application, etc. Then, the communication device 100-1 transmits the display image G3 to the communication device 100-2, and the communication device 100-2 displays the display image G3.

Returning to FIG. 4, when the device is not a source device (No at S2), that is, when the device is a sink device (communication device 100-2), the controller 103 of the device determines whether a secondary screen not subjected to copyright protection is to be generated for the sink device (S8). The secondary screen is a screen for the display corresponding to the user operation performed on the source device, and contains, in addition to the contents to be reproduced, a pointer image, a menu image, and various kinds of information that correspond to the user operation, for example. Therefore, it is determined at S8, based on whether the copyright protection is required for the contents displayed on the display 106 of the device comprising the controller 103 as a sink device, that the secondary screen is to be generated when the contents require no copyright protection and that the secondary screen is not to be generated when the contents require copyright protection.

When the contents to be displayed on the display 106 are contents requiring copyright protection and a secondary screen not subjected to copyright protection is not to be generated for the sink device (Yes at S8), the transmission of contents data from the source device to the sink device (device comprising the controller 103) through the transmission path M1 is started/continued (S5), and the controller 103 of the device displays the contents transmitted through the transmission path M1 as they are on the display 106.

When the contents to be displayed on the display 106 are contents requiring no copyright protection and a secondary screen not subjected to copyright protection is to be generated for the sink device (Yes at S8), the controller 103 receives, through the wireless communication module 102, the user operation received at the operation module 105 of the source device (communication device 100-1). Subsequently, the controller 103 controls the image generator 1032 to generate a secondary screen based on partial data of the display screen of the display 106 such as the coordinate information corresponding to the operation on the operation module 105 of the communication device 100-1 (S9). To be more specific, the controller 103 controls the image generator 1032 to generate a display image containing contents to be displayed and a pointer image, a menu image, and an image of various kinds of information that correspond to the operation on the operation module 105 of the communication device 100-1, and displays the display image on the display 106.

FIG. 9 is a conceptual diagram exemplifying display screens of the communication devices 100-1 and 100-2 in the embodiment. As illustrated in FIG. 9, in the communication device 100-2 on the sink device, when contents to be displayed are contents requiring no copyright protection, such contents and the pointer image G11 corresponding to the touch operation with the hand H of the user on the source device are displayed on the display 106 of the communication device 100-2. That is, when the user operates the communication device 100-1 while the communication device 100-2 reproduces contents not subjected to copyright protection, the display 106 of the communication device 100-2 displays the pointer image G11 corresponding to such operation. Therefore, even when operating the communication device 100-1 while viewing contents reproduced in the communication device 100-2, the user does not need to confirm the display 106 of the communication device 100-1, which improves the convenience.

As illustrated in FIG. 9, the image generator 1032 on the sink device may generate the display image G3 containing the pointer image G11, the menu image G12, and the information image G13 that correspond to the operation on the operation module 105. The display image G3 is transmitted to the communication device 100-1 through the transmission path M1 and displayed on the display 106 of the communication device 100-1. In this manner, an operation screen of the communication device 100-1 may be generated on the sink device.

After S5, the controller 103 determines whether the display screen is to be changed based on an operation instruction on the operation module 105 (S10). When the display screen is to be changed (Yes at S10), the controller 103 returns the processing to S2. When the display screen is not to be changed (No at S10), the controller 103 determines whether the transmission (reproduction) of the contents is to be completed based on whether the end conditions for finishing reproduction of contents or for stopping operation are fulfilled (S11). When the transmission (reproduction) of the contents is not to be completed (No at S11), the controller 103 returns the processing to S5 to continue transmission (reproduction) of the contents. When the transmission (reproduction) of the contents is to be completed (Yes at S11), the controller 103 finishes the processing.

First Modification

Next, a modification of the embodiment described above will be described. The following modification exemplifies a case in which a source device and a sink device display a different image as an image corresponding to the operation on the operation module 105.

FIG. 10 is a conceptual diagram exemplifying display screens of the communication devices 100-1 and 100-2 according to a modification. As illustrated in FIG. 10, the communication device 100-1 as a source device displays an input pad image G14 receiving an input with the hand H of the user on the display 106 as an image supporting an operation input performed by the user. The communication device 100-2 serving as a sink device displays a recognized character image G15 obtained by recognizing the operation received on the input pad image G14 as an image representing a result of the operation input performed by the user.

To be more specific, the image generator 1032 of the communication device 100-1 generates the display image G1 containing the input pad image G14 supporting an operation input with the hand H of the user. When the contents to be transmitted to the communication device 100-2 are contents requiring no copyright protection, the image generator 1032 of the communication device 100-1 generates the display image G3 containing the recognized character image G15 obtained by recognizing the operation received on the input pad image G14. Then, the controller 103 of the communication device 100-1 transmits the generated display image G3 to the communication device 100-2. The communication device 100-2 displays the transmitted display image G3 on the display 106.

The display on the display 106 of the communication device 100-2 may employ a picture-in-picture format. FIG. 11 is a conceptual diagram exemplifying display screens of the communication devices 100-1 and 100-2 in the modification. To be more specific, FIG. 11 is a conceptual diagram exemplifying the display screens employing the picture-in-picture format.

As illustrated in FIG. 11, it is possible to combine the recognized character image G15 onto the display image G4 of the communication device 100-2 serving as a sink device and display the combined image. In this case, the controller 103 of the communication device 100-1 may control the image generator 1032 to generate the recognized character image G15 obtained by recognizing the operation received on the input pad image G14, and transmit the generated recognized character image G15 to the communication device 100-2.

The image supporting an operation input performed by the user and the image representing a result of an operation input performed by the user described here are one examples, and they may be a software keyboard image and an input text image, for example, in addition to the input pad image G14 and the recognized character image G15. As described above, in the modification, the user can receive the input support on the display 106 of the communication device 100-1 and, at the same time, confirm an input result while viewing contents reproduced in the communication device 100-2, which improves the convenience.

Computer programs executed in the communication devices 100-1 and 100-2 in the embodiment are preliminarily embedded and provided in the ROM, etc. Each computer program executed in the communication devices 100-1 and 100-2 in the embodiment may be recorded, as a file whose format is installable or executable, in a computer readable recording medium such as a compact disc read only memory (CD-ROM), a flexible disk (FD), a compact disk recordable (CD-R), and a digital versatile disk (DVD), and then provided.

The computer programs to be executed by the communication devices 100-1 and 100-2 of the embodiment may also be stored in a computer connected to a network such as the Internet and provided by being downloaded over the network. The provided programs to be executed by the communication devices 100-1 and 100-2 of the embodiment may still be provided or distributed over a network such as the Internet.

The computer program executed in the communication devices 100-1 and 100-2 in the embodiment is of a module configuration comprising the modules described above. As actual hardware, the CPU (processor) reads out the computer program from the above ROM and executes it, whereby the function configuration described above is loaded on a main storage and generated.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus comprising:
communication circuitry configured to communicate with a target apparatus connected through a transmission path;
a user interface configured to receive a user operation; and
processing circuitry configured to:
determine whether a first content is subject to copyright protection;
generate a first video comprising a first image according to the first content, when the first content is subject to copyright protection, wherein the first video is transmitted to a target apparatus by the communication circuitry according to a copyright protection scheme and
generate a second video comprising the first image and a second image operable via the user interface when the first content is not subject to copyright protection, wherein the second video is transmitted to the target apparatus by the communication circuitry.

2. The communication apparatus of claim 1, wherein
the user interface is a touch panel configured to receive a touch operation by the user, and
the processing circuitry is configured to perform, when the first content is not subject to copyright protection, controlling so as to generate the second video comprising the first image and the second image, the second image corresponding to a touch position or a touch direction on the touch panel indicated by the touch operation, and to transmit the second video to the target apparatus.

3. The communication apparatus of claim 1, wherein the transmission path is a wireless transmission path.

4. The communication apparatus of claim 1, further comprising:
a display, wherein
the processing circuitry is configured to:
control displaying of the display,
generate a third image included in the second image,
display the display screen containing the generated third image on the display, and
generate the second video comprising the first image and the third image, when the first content is not subject to copyright protection, wherein the second video is transmitted to the target apparatus by the communication circuitry.

5. The communication apparatus of claim 4, wherein the third image is a pointer image corresponding to the user operation.

6. The communication apparatus of claim 4, wherein
the processing circuitry is configured to:
generate a fourth image included in the second image corresponding to the user operation and being different from the third image, and
generate the second video comprising the first image and the fourth image, when the first content is not subject to copyright protection, wherein the second video is transmitted to the target apparatus by the communication circuitry.

7. The communication apparatus of claim 6, wherein
the third image is an image configured to support an operation input performed by the user, and
the fourth image is an image configured to indicate a result of the operation input performed by the user.

8. The communication apparatus of claim 1, further comprising:
a display, wherein the processing circuitry is configured to control displaying of the display, the user interface is configured to receive, through the communication circuitry, the user operation received by the target apparatus, and the processing circuitry is configured to display the first video, when the first content to be displayed is subject to copyright protection, and to display, when the first content to be displayed is not subject to copyright protection, the second video comprising the first image according to the first content to be displayed and the second image corresponding to the user operation received by the target apparatus.

9. A communication apparatus comprising:

a display configured to display an image;
  a touch panel configured to receive a touch operation performed by a user on the display; and
  processing circuitry configured to:
  output an image in which a GUI is arranged;
display the output image on the display;
encode the output image;
transmit the encoded image to a target apparatus;
perform a first mode and a second mode in a switching manner, wherein,
  in the first mode, the image is transmitted to the target apparatus while the image is displayed on the display, and upon receipt of a first operation by the touch panel, the GUI displayed at a position of the first operation is selected, and,
  in the second mode, the image is transmitted to the target apparatus while the image is not displayed on the display, and upon receipt of a second operation by the touch panel, the GUI arranged in the image is selected based on position information of when operation on the touch panel performed before the second operation is finished and position information of the second operation;
determine whether a first content is subject to copyright protection;
generate a first video comprising a first image according to the first content, when the first contents is subject to copyright protection, wherein the first video is transmitted to the target apparatus by a communication circuitry according to a copyright protection scheme; and
generate a second video comprising the first image and a second image operable via the touch panel, when the first contents is not subject to copyright protection, wherein the second video is transmitted to the target apparatus.

10. A communication method of a communication apparatus, comprising:

communicating, by communication circuitry, with a target apparatus connected through a transmission path;
receiving, by a user interface, a user operation;
determining, by processing circuitry, whether a first content is subject to copyright protection; and
generating a first video comprising a first image according to the first content, by the processing circuitry, when the first content is subject to copyright protection, wherein the first video is transmitted to a target apparatus by the communication circuitry according to a copyright protection scheme; and
generating a second video comprising the first image and a second image operable via the user interface, when the first content is not subject to copyright protection, wherein the second video is transmitted to the target apparatus by the communication circuitry.

11. The communication method of claim 10, wherein the user interface is a touch panel configured to receive a touch operation by the user, and
the method further comprises performing, by the processing circuitry, when the first content is not subject to copyright protection, controlling so as to generate the second video comprising the first image and the second image, the second image corresponding to a touch position or a touch direction on the touch panel indicated by the touch operation, and to transmit the second video to the target apparatus.

12. The communication method of claim 10, wherein the transmission path is a wireless transmission path.

13. The communication method of claim 10, further comprising:

controlling, by the processing circuitry, displaying of a display;
generating a third image included in the second image;
displaying the display screen containing the generated third image on the display; and
generating the second video comprising the first image and the third image, when the first content is not subject to copyright protection, wherein the second video is transmitted to the target apparatus by the communication circuitry.

14. The communication method of claim 13, wherein the third image is a pointer image corresponding to the user operation.

15. The communication method of claim 13, further comprising:

generating, by the processing circuitry, a fourth image included in the second image corresponding to the user operation and being different from the third image; and
generating the second video comprising the first image and the fourth image, when the first content is not subject to copyright protection, wherein the second video is transmitted to the target apparatus by the communication circuitry.

16. The communication method of claim 15, wherein the third image is an image configured to support an operation input performed by the user, and
the fourth image is an image configured to indicate a result of the operation input performed by the user.

17. The communication method of claim 10, further comprising:

controlling, by the processing circuitry, displaying of a display;
receiving, by the user interface, through the communication circuitry, the user operation received by the target apparatus; and
displaying, by the processing circuitry, the first video, when the first content to be displayed is subject to copyright protection, and displaying, when the first content to be displayed is not subject to copyright protection, the second video comprising the first image according to the first content to be displayed and the second image corresponding to the user operation received by the target apparatus.

18. A communication method of a communication apparatus, comprising:

outputting, by a processing circuitry, an image in which a graphics user interface (GUI) is arranged;
displaying, by the processing circuitry, the output image on a display;
encoding, by the processing circuitry, the output image;

transmitting, by the processing circuitry, the encoded image to a target apparatus;
performing, by the processing circuitry, a first mode and a second mode in a switching manner, wherein,
  in the first mode, the image is transmitted to the target apparatus while the image is displayed on the display, and upon receipt of a first operation by a touch panel that is configured to receive a touch operation performed by a user on the display, the GUI displayed at a position of the first operation is selected, and,
  in the second mode, the image is transmitted to the target apparatus while the image is not displayed on the display, and upon receipt of a second operation by the touch panel, the GUI arranged in the image is selected based on position information of when operation on the touch panel performed before the second operation is finished and position information of the second operation;
determining, by the processing circuitry, whether a first content is subject to copyright protection;
generating, by the processing circuitry, a first video comprising a first image according to the first content, when the first content is subject to copyright protection, wherein the first video is transmitted to the target apparatus by a communication circuitry according to a copyright protection scheme; and
generating, by the processing circuitry, a second video comprising the first image and a second image operable via the touch panel, when the first content is not subject to copyright protection, wherein the second video is transmitted to the target apparatus.

* * * * *